United States Patent [19]
Schuster

[11] Patent Number: 6,141,978
[45] Date of Patent: Nov. 7, 2000

[54] METHOD AND APPARATUS FOR ELIMINATING UNNECESSARY DEFROST CYCLES IN HEAT PUMP SYSTEMS

[75] Inventor: Don A. Schuster, Martinsville, Ind.

[73] Assignee: Carrier Corporation, Farmington, Conn.

[21] Appl. No.: 09/391,589

[22] Filed: Sep. 7, 1999

Related U.S. Application Data

[63] Continuation-in-part of application No. 08/995,624, Dec. 22, 1997.

[51] Int. Cl.[7] .................................................... F25D 21/06
[52] U.S. Cl. ................................. 62/155; 62/156; 62/186; 62/DIG. 17
[58] Field of Search ............................. 62/155, 156, 230, 62/234, 151, 154, 180, 186, 208, 228.3, DIG. 17

[56] References Cited

U.S. PATENT DOCUMENTS

| | | | |
|---|---|---|---|
| 4,406,133 | 9/1983 | Saunders et al. | 62/156 X |
| 5,775,116 | 7/1998 | Matsumoto et al. | 62/155 |
| 5,782,101 | 7/1998 | Dennis | 62/186 |
| 5,870,899 | 2/1999 | Choi | 62/156 X |

Primary Examiner—Harry B. Tanner
Attorney, Agent, or Firm—Wall Marjama & Bilinski

[57] ABSTRACT

An improved method and apparatus for limiting the pressure in the high pressure side of a heat pump system to a safe value, without causing the defrost control circuitry thereof to initiate unnecessary defrost cycles. When the heat pump system is operating in its heating mode, pressure limiting circuitry limits the pressure in the high side thereof to a safe value by turning the outdoor fan off, and holding it off, when the vapor pressure in the vapor containing parts of the system is equal to or greater than a preset threshold pressure. When ambient conditions are such that frost is able to form on the outdoor coil, the activity of the pressure limiting circuitry is used to reset the defrost delay time or otherwise inhibit the operation of the defrost control circuitry.

19 Claims, 2 Drawing Sheets

METHOD AND APPARATUS FOR ELIMINATING UNNECESSARY DEFROST CYCLES IN HEAT PUMP SYSTEMS

CROSS REFERENCE TO RELATED APPLICATION

The present application is a continuation-in-part of prior U.S. CPA Ser. No. 08/995,624, filed Dec. 22, 1997.

BACKGROUND OF THE INVENTION

The present invention relates to heat pump systems, and is directed more particularly to an improved apparatus and method for limiting the pressure in the high pressure side of a heat pump system to a safe value, without causing the defrost control circuitry thereof to initiate unnecessary defrost cycles.

Because of concern about environmental effects, the CFC and HCFC refrigerants which were once commonly used in residential and light commercial heat pump systems are being phased out, and replaced by non-chlorinated refrigerants. One of the more promising ones of these replacement refrigerants is HFC R-410A. Unfortunately, these replacement refrigerants can establish, in the high pressure sides of the systems in which they are used, operating pressures which are up to 70% higher than those established by the refrigerants which they replace.

One way of enabling heat pump systems to operate with non-chlorinated refrigerants is to replace the piping used in the high pressure sides thereof with piping that is capable of withstanding the higher pressures that are associated with such refrigerants. In the case of a heat pump system, the cost of replacing this piping can be prohibitively expensive. This is because the high pressure side of the system includes not only the piping included in the outdoor unit, but also the piping, commonly referred to as the "line set", which connects the outdoor unit to the indoor unit, and which is usually located underground and/or within the walls of the structure to be heated.

Another way of enabling heat pump systems to operate with non-chlorinated refrigerants is to include in the heat pump system equipment which monitors the pressure within the high pressure side of the system, and takes action to limit that pressure when it equals or exceeds a threshold pressure that is less than the maximum pressure at which the system may operate safely. One example of pressure limiting equipment of this type is described in copending U.S. patent application Ser. No. 08/995,624, filed Dec. 22, 1997, which is assigned to assignee of the present invention. The latter pressure limiting equipment includes a pressure sensitive switch which monitors the pressure of the refrigerant fluid within the vapor line of the outdoor unit, and turns the outdoor fan on and off (i.e., cycles the outdoor fan) as necessary to limit the pressure in the vapor line and line set to a safe value.

While the above-mentioned pressure limiting equipment is able to solve the pressure problems associated with the use of non-chlorinated refrigerants, it can cause the heat pump system to operate inefficiently when it is operating in its heating mode at relatively high outdoor temperatures. This is because, under the latter operating condition, the temperature of the outdoor coil may fluctuate in a manner that causes the heat pump system to initiate a defrost cycle even though there is then little or no ice on the outdoor coil. Such defrost cycles not only result in the unnecessary expenditure of the energy necessary to perform them, they also prevent the heat pump system from providing the heat necessary to maintain the temperature of the space to be heated. As a result, the heat pump system must switch over to an alternative heat source which provides heat while the defrost cycle is in progress, but which does so at a cost which is significantly higher than the cost of operating the heat pump system.

In view of the forgoing, it will be seen that, prior to the present invention, the practicability of using pressure limiting equipment to enable heat pump systems to operate with non-chlorinated refrigerants, without using piping having a pressure rating higher than that used with chlorinated refrigerants, was limited by the tendency of the pressure limiting equipment to initiate unnecessary defrost cycles.

SUMMARY OF THE INVENTION

In accordance with the present invention there is provided an apparatus and method which not only limits the pressure in the high pressure side of a heat pump system, and thereby enables the heat pump system to use non-chlorinated refrigerants with existing piping, but which does so without causing the system to initiate defrost cycles that are not called for by the conditions under which the system is operating.

In its apparatus aspect, the present invention comprises an apparatus which limits the pressure in the high pressure side of a heat pump system to a safe maximum value, but which prevents the defrosting circuitry of the heat pump system from initiating defrost cycles merely because this pressure limiting activity is in progress. In heat pump systems which control defrosting by the time-temperature method, a defrost cycle is initiated a predetermined defrost delay time after the temperature of the outdoor coil falls below a first temperature, unless the temperature of the outdoor coil in the meantime rises above a second temperature and thereby resets the defrost delay time to its initial value. In accordance with the present invention, it has been discovered that the cause of the problem in systems which use this defrosting method is that the pressure limiting equipment prevents the temperature of the outdoor coil from rising above the second temperature.

In the preferred and simplest embodiment of the apparatus of the invention, the abovedescribed problem is solved by including in the outdoor control unit of the system a device that resets the defrost delay time of the defrosting circuitry when pressure limiting activity is in progress. This device preferably takes the form of a switching device which is responsive to the pressure in the vapor line of the outdoor unit, and which is connected in series with the thermostat that is used to sense the temperature of the outdoor coil. With this embodiment, the initiation of pressure limiting activity has the effect of simulating the presence of an open condition in the thermostat and, consequently, the existence of an outdoor coil temperature that is too high for frost to form thereon. As a result, this embodiment has the effect of resetting the defrost delay time of the defrosting circuitry, and thereby preventing the latter from timing out and initiating a defrost cycle. It will be understood, however, that other types of devices, which are responsive to the pressure limiting process, may be used to disable or inhibit the operation of defrosting circuitry in other ways, without departing from the teachings of the present invention, if they produce similar results under similar sets of operating conditions.

In its method aspect, the present invention comprises the inclusion, in the time-temperature method of defrosting, of the step of resetting the defrost delay time, or otherwise inhibiting or disabling the defrosting process, under conditions that are known to be associated with the occurrence of unnecessary defrost cycles. These conditions typically comprise one or more of: (a) the operation of the system in its heating mode and (b) a relatively high outdoor temperature, and (c) the combination of a frost forming condition at the outdoor coil with the operation of the system's pressure limiting equipment. The method of the present invention may, therefore, be practiced by any method which includes the steps of detecting the occurrence of these conditions, and disabling or inhibiting the defrosting process when, but only when, such conditions exist.

In the preferred embodiment, the method of the invention includes the step of detecting when a frost forming condition at the outdoor coil coincides with the activation of a switch which is responsive to the pressure in the vapor line of the outdoor unit, followed by the step of resetting the defrost delay time of the defrosting circuitry. It will be understood, however, that other condition detecting steps may be combined with other defrost inhibiting steps, without departing from teachings of the present invention, if such combinations of steps produce similar results under similar sets of operating conditions.

Other objects and advantages of the invention will be apparent from the following description and drawings, in which:

DESCRIPTION OF THE PREFERRED EMBODIMENT

Figure 1:
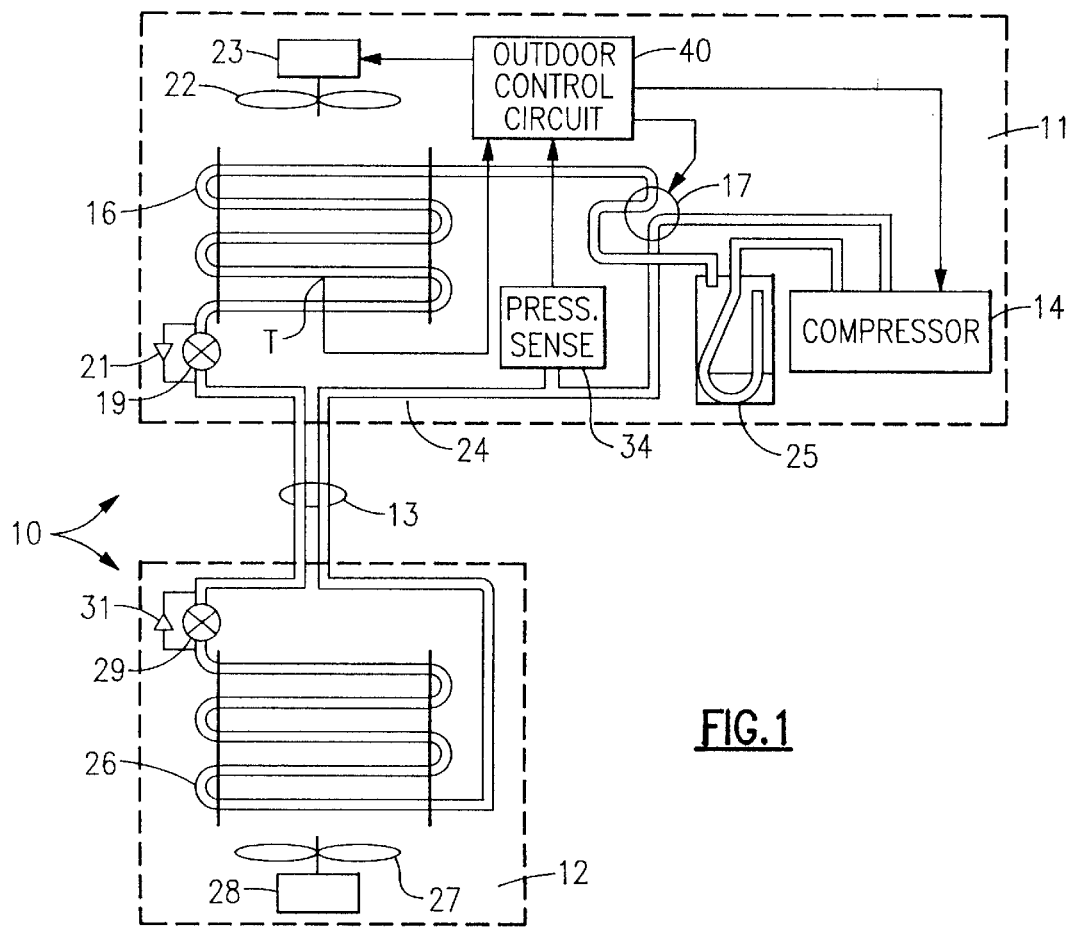
FIG. 1 is a simplified representation of a heat pump system of a type that may be used in practicing the present invention.

Referring to FIG. 1 there is shown heat pump system 10 having an outdoor unit 11 and an indoor unit 12 which are interconnected by a pair of pipes 13 that are commonly referred to collectively as a line set. Outdoor unit 11 includes a compressor 14 and a heat exchanger coil 16 which cooperate with a heat exchanger coil 26 in indoor unit 12 to form a heat exchange system which may operate in either a heating or a cooling mode. Outdoor coil 16 acts as a condenser coil when system 10 is operating in its cooling mode and as an evaporator when system 10 is operating in its heating mode. 1 1. Similarly, indoor coil 26 operates as an evaporator when system 10 is operating in its cooling mode and as a condenser when system 10 is operating in its heating mode. An accumulator 25, connected between valve 17 and compressor 14, prevents liquid refrigerant from flowing back into compressor 14. A four way valve 17 is included in outdoor unit 11 to switch system 10 between operation in these modes.

Outdoor unit 11 also includes a fan 22 which is driven by a motor 23 to circulate air over outdoor coil 16 and thereby increase the rate at which coil 16 may exchange heat with the atmosphere. Similarly, indoor unit 12 includes a fan 27 which is driven by a motor 28 to circulate air over indoor coil 26 and thereby increase the rate at which coil 26 may exchange heat with the space to be heated or cooled.

Outdoor unit 11 further includes an expansion device 19 which is active when system 10 operates in its heating mode, and a bypass line 21 which bypasses expansion device 19 when system 10 operates in its cooling mode. A similar expansion device 29 and a similar bypass line 31 are included in indoor unit 12.

Figure 2:
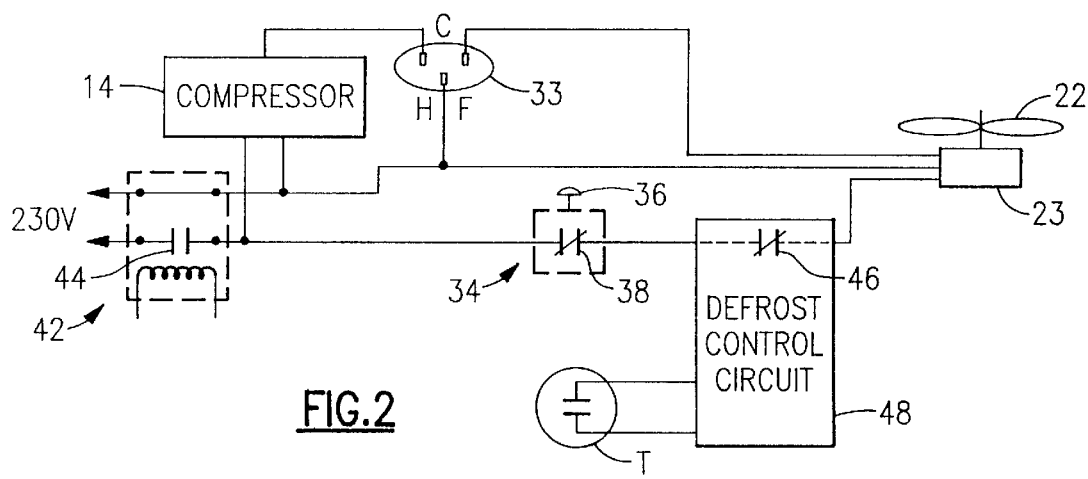
FIG. 2 is a simplified block-schematic diagram of a part of an outdoor control circuit of a type which was used in the heat pump system of FIG. 1 prior to the present invention.

The operation of outdoor unit 11 is controlled by an outdoor control circuit 40 which is, in turn, controlled by a system control unit (not shown) that is located within the space to be heated or cooled, and that is connected to outdoor unit 11 via control cables (not shown) routed therebetween. Outdoor control circuit 40 responds to calls for heating or cooling by applying appropriate sets of control signals to compressor 14, valve 17 and outdoor fan motor 23. As is best seen in FIG. 2, outdoor control circuit 40 includes a power relay 42 having a set of contacts 44 for controllably connecting compressor 14 to a high voltage, e.g., 230 volt, AC power source. Contacts 44 also serve to connect the AC power source to the motor 23 which drives outdoor fan 22. The latter connection is usually completed through a defrost control circuit 48 which will be described more fully later. Outdoor control circuit 40 also includes a dual capacitor 33 which serves both as a run capacitor for compressor 14 and as a run capacitor for fan motor 23. Because these elements and the manner in which they operate are known to those skilled in the art, they will not be further described herein.

Figure 3:
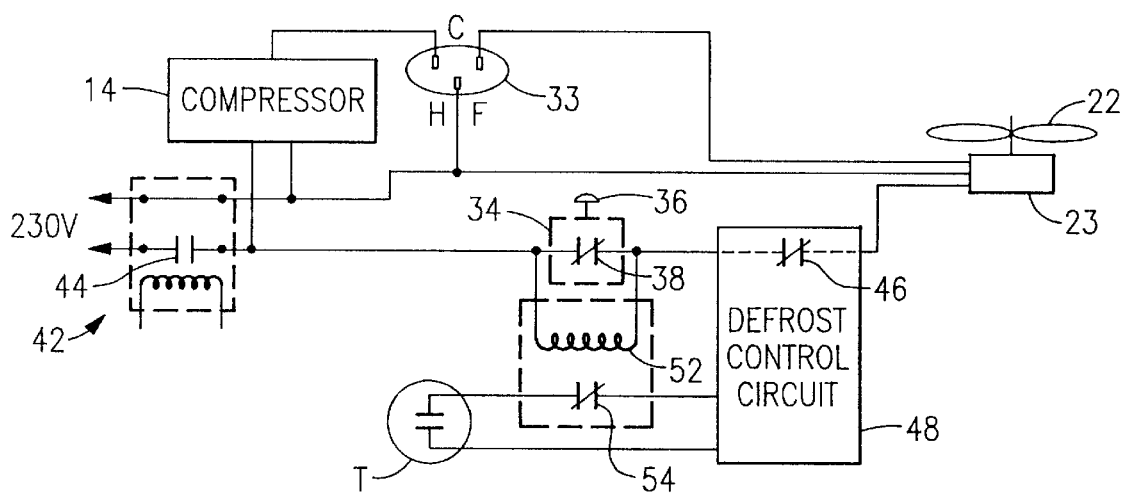
FIG. 3 is a simplified block-schematic diagram of one embodiment of an improved outdoor control circuit that has been constructed in accordance with the present invention.

Outdoor control circuits, such as outdoor control circuit 40 of FIGS. 1 and 2, typically include a defrost control circuit 48, which is shown in block-schematic form in FIGS. 2 and 3, and which is arranged to detect frost forming conditions at outdoor coil 16, usually by means of a suitable thermostat T. When such conditions are detected, defrost circuit initiates a series of defrosting steps, herein referred to as defrost cycles, when and as necessary to assure that the heat exchange efficiency of coil 16 is not impaired by accumulations of ice thereon. Defrost control circuit 48 is preferably of the type which uses the time-temperature method of defrosting, i.e., which initiates a defrost cycle a predetermined defrost delay time after thermostat T indicates that a frost forming condition exists at outdoor coil 16. Such defrost cycles are usually initiated by the opening of a set of normally closed contacts 46, which are shown within the interior of block 48. Since defrost control circuits of this type are in widespead use, and are manufactured as Carrier Corp. part no. CES0110063, the structure and operation thereof will be described herein only to the extent necessary to facilitate an understanding of the present invention.

As explained in copending prior application Ser. No. 08/995,624, filed Dec. 22, 1997, which is hereby incorporated herein by reference, heat pump systems of the type shown in FIG. 1 may be used with non-chlorinated refrigerants, without using piping having a pressure rating higher than that used with chlorinated refrigerants, if they are provided with equipment which limits the pressure of the refrigerant in the high pressure sides thereof, i.e., in vapor line 24 and the vapor carrying one of the pipes in line set 13. The pressure limiting equipment described in the last-mentioned copending application, which is most clearly shown in FIG. 2 hereof, takes the form of a pressure sensitive switch 34. This switch preferably includes a pressure sensing diaphragm or element 36 that is connected in pressure sensing relationship to vapor line 24, and a set of normally closed contacts 38 that is connected in series with outdoor fan motor 23. When the pressure sensed by pressure sensitive switch 34 equals or exceeds a first predetermined threshold pressure, contacts 38 open, causing outdoor fan motor 23 to turn off. This, in turn, causes the refrigerant pressure on the high side of the system to fall. When the refrigerant pressure has fallen below a second predetermined threshold pressure, contacts 38 close and cause motor 23 to turn on again. It will therefore be seen that, with an appropriate choice of threshold pressures, the pressure dependent on-off switching or cycling of outdoor fan 22 may be used to prevent the refrigerant pressure in vapor line 24 and line set 13 from exceeding the maximum safe operating pressure thereof.

As will be apparent to those skilled in the art, the above-described pressure limiting effect may be achieved not only with fan motors which operate at a single speed, and therefore have only an on state and an off state, but also with motors that operate at a number of different nominally fixed speeds, and with motors that operate at continuously variable speeds. a two-speed fan motor can, for example, be used if the high speed is used during normal operation and the low speed is used during periods in which the first threshold pressure has been exceeded. Motors of this type include induction type motors with single or multiple speeds, and are commercially available from motor manufacturers such as General Electric, A. O. Smith, or Emerson. Similarly, a motor with a continuously variable speed can be used to drive fan 22 if its higher speeds are used for normal fan operation and its lowest speed or off state is used when the first threshold pressure has been exceeded. It will therefore be understood that the present invention may be practiced with all fan speed based pressure limiting systems, without regard to the speed characteristics of the motors used therein.

When heat pump system 10 is operating in its cooling mode, the pressure limiting activity of pressure sensitive switch 34 and the defrosting activity of defrost circuit 40 have no tendency to interfere with one another. This is because pressure switch 34 causes the speed of fan 22 to change as necessary to limit the pressure within the high pressure side of the system to a safe maximum value, and because the temperature of the outdoor coil never falls to a value low enough for thermostat T to indicate to defrost circuit 48 that defrosting is necessary.

When heat pump system 10 is operating in its heating mode, however, the pressure limiting activity of pressure switch 34 and the defrosting activity of defrost control circuit 48 can interfere with one another, particularly when outdoor temperatures are high. This is in part because the turn off of fan 22 can cause the temperature of outdoor coil 16 to fall to a temperature low enough for thermostat T to close, thereby indicating to defrost control circuit 48 that ice may be forming on coil 16 and that it should begin timing the defrost delay period. This is also in part because the subsequent turn on of fan 22 may not allow the temperature of outdoor coil 16 to rise high enough to cause thermostat T to reopen and thereby reset the defrost delay period of defrost control circuit 48. As a result, defrost circuit 48 may initiate one or more unnecessary defrost cycles.

In accordance with the present invention, such unnecessary defrost cycles are prevented by modifying the outdoor control circuitry so that defrosting circuit 48 is unable to initiate defrost cycles merely because the pressure limiting equipment is causing the outdoor fan to cycle on and off. As will be explained more fully presently, this is preferably accomplished by resetting or otherwise inhibiting the defrost initiating activity of the defrost control circuit 48 when the pressure within the high pressure side of the system, or when some other condition or combination of conditions in outdoor unit 1, indicates that pressure limiting activity is in progress.

Referring to FIG. 3, there is shown one embodiment of an outdoor control circuit which has been modified in accordance with the present invention. The embodiment of FIG. 3 is generally similar to that of FIG. 2, like functioning parts being similarly numbered, except that the circuit of FIG. 3 includes additional, defrost inhibiting circuitry which so interrelates the pressure limiting and defrosting activities thereof that defrosting cycles are initiated only when they are actually necessary to remove ice from outdoor coil 16. In the embodiment of FIG. 3, this additional circuitry includes a relay 50 which includes a coil 52 that is connected across normally closed contacts 38 of pressure sensitive switch 34, and a set of normally closed contacts 54 that are connected in series with thermostat T.

When the pressure in vapor line 24 has a value less than the first threshold pressure, contacts 38 are in their normally closed states, and prevent coil 52 from being energized. Under this condition, contacts 54 remain in their normally closed state and allow defrost control circuit 48 to begin timing the defrost delay period as soon as thermostat T closes in response to the sensing of a predetermined low temperature at outdoor coil 16. If the above-described condition continues until the defrost delay period elapses, defrost control circuit 48 will initiate a defrost cycle in the usual way and melt any ice which has formed on outdoor coil 16. As this occurs, defrost contacts 46 open to establish the fan off state that is associated with defrosting condition. Thus, the presence of relay 50 will be seen not to interfere with the normal defrosting activity of defrost control circuit 48.

If, however, the pressure in vapor line 24 equals or exceeds the first threshold pressure, contacts 38 will open, causing contacts 54 to open. Contacts 54 will open because, under this condition, current is able to flow through coil 52 through a path that includes the high voltage (230 volt) source, one of the windings of fan motor 23 and defrost contacts 46. As contacts 54 open they present an open circuit to defrost control circuit 48 and thereby simulate the condition which exists when thermostat T opens to indicate that the temperature of coil 16 has become high enough that defrosting is no longer necessary. This, in turn, resets the defrost delay time of defrost circuit 48 to zero, and thereby inhibits the occurrence of a defrost cycle. Since, as previously described, pressure switch 34 will open and close repeatedly, as necessary to limit the pressure in the high side of system 10, the defrost delay time of defrost circuit 48 will be reset repeatedly as long as the pressure in the high side of the system tends to exceed the limits set thereon. It will therefore be seen that relay 50 will cause defrosting to be postponed as long as the pressure switch cycles on and off within a time less than the defrost delay time and, consequently, that defrosting cannot occur merely as a result of the pressure limiting activity of the pressure limiting equipment of outdoor unit 11.

The embodiment described in connection with FIG. 3 comprises only an exemplary one of a number of different structures that may be used to implement the apparatus aspect of the present invention. Pressure sensitive switch 34 may, for example, be replaced by the combination of a first, sensing device or circuit which serves only to sense and output a signal indicative of the pressure in the high pressure side of system 10, and a second, switching device or circuit which serves only to switch on and off in response to such a sensed signal. Thus, the practice of the present invention is not limited to the numbers or types of elements that are used to detect that pressure limiting activity is in progress.

In addition, since the laws of thermodynamics require that a one-to-one correspondence exist between the pressure and temperature of the vapor and liquid phases of closed refrigerant system, the existence of a need to take action to limit the pressure in the high pressure side of system 10 can be determined as readily by sensing the temperature of that system as by sensing the pressure of that system. Thus, the present invention may be practiced by sensing either one or both of the temperature and pressure in the high pressure side of the system.

Finally, since the time-temperature defrost method may be practiced using defrost control circuits having any of a number of different designs, there are a number of different ways in which the detection of pressure limiting activity may be used to reset or otherwise inhibit the initiation of defrost cycles by the defrost control circuit. If, for example, the defrost control circuitry includes combinational logic devices which initiates defrost cycles in response to predetermined combinations of states among a plurality of conditions or variables, defrosting may be inhibited by negating one or more of the appropriate ones of these conditions or variables, or by imposing additional conditions, particularly those involving the presence of pressure limiting activity and/or the passage of time. Thus, the present invention may be practiced in heat pump systems that have defrost control circuits which do not include, or operate in conjunction with, elements that have moving parts, such as mechanical thermostats or relays.

In view of the foregoing, it will be seen that the present invention is relatively independent of the types or structures of the devices that are used to practice it. The present description will therefore conclude with a brief summary of how the present invention may be practiced as a method, without specifying the particular kinds of electrical, mechanical or electromechanical devices used therein. When considered in this way, the application of the method of the invention to a heat pump system which uses the above-described types of pressure limiting and defrosting methods may be regarded as including at least the following steps:

(a) sensing one of the pressure and temperature of the refrigerant fluid in the vapor containing parts of the system, particularly the outdoor coil, to determine if the pressure therein is equal to or greater than a predetermined threshold pressure;

(b) stopping and starting (or at least decreasing and increasing) the flow of air across the outdoor coil in order to maintain the pressure in the vapor containing parts of the system at a pressure less than a predetermined maximum safe pressure;

(c) initiating a defrost cycle when a frost forming condition exists at the outdoor coil for more than a predetermined defrost delay time; and (d) inhibiting the initiating step when the frost forming condition exists merely as a result of the performing of the starting and stopping step.

Alternative embodiments of the above-summarized method will be apparent to those skilled in the art in view of the earlier description of alternative embodiments of the apparatus of the invention. The initiating step, for example, may comprise the restarting of the defrost delay time when the flow of air across the outdoor coil is stopped or decreased. The method of the invention can also be practiced by including additional steps that place restrictions on the conditions under which it is applied. The performance of the method of the invention might, for example be conditioned upon the heat pump system operating in its heating mode at relatively high outdoor ambient temperatures. It will be understood that these and other embodiments of a type that would be obvious to those skilled in the art are within the contemplation of the present invention.

While the method and apparatus of the invention have been described with reference to a number of specific embodiments, it will be understood that the true spirit and scope of the present invention should be determined with reference to the following claims.

What is claimed is:

1. In an apparatus for use in a heat pump system of the type including a compressor, an outdoor unit having an outdoor coil and an outdoor fan, an indoor unit having an indoor coil and an indoor fan, and a liquid line and a vapor line for connecting said indoor and outdoor coils and said compressor in a closed fluidic path, said heat pump system being adapted to operate in any of a cooling mode, a heating mode and a defrosting mode, in combination:

(a.) a defrost condition detecting device, connected to the outdoor coil, for detecting the occurrence of a frost forming condition at the outdoor coil;

(b.) a control circuit for controlling the operation of said outdoor unit, said control circuit including:

(i) pressure limiting circuitry, responsive to one of the pressure and temperature of the refrigerant fluid in said vapor line, for limiting the pressure within said vapor line to a predetermined safe pressure; and (ii) defrost control circuitry, responsive to said defrost condition detecting device, for causing the heat pump system to initiate a defrost cycle when said frost forming condition has existed for more than a predetermined time; and (c.) a defrost inhibiting device for preventing said defrost control circuitry from initiating a defrost cycle when the defrost condition detecting device indicates the occurrence of a frost forming condition merely because of the pressure limiting activity of said pressure limiting circuitry.

2. An apparatus as set forth in claim 1 in which said pressure limiting circuitry includes a pressure sensitive switch connected in pressure sensing relationship to said vapor line.

3. An apparatus as set forth in claim 1 in which said pressure limiting circuitry includes a pressure indicating device for indicating when the pressure in said vapor line is equal to or greater than a predetermined threshold pressure, and fan speed control circuitry, responsive to said pressure indicating device, for reducing the speed of said outdoor fan as necessary to limit the pressure in said vapor line to said predetermined safe pressure.

4. An apparatus as set forth in claim 1 in which said pressure limiting circuitry includes a pressure sensing device for sensing when the pressure in said vapor line is equal to or greater than a predetermined threshold pressure, and fan speed control circuitry, responsive to said pressure sensing device, for reducing the speed of said outdoor fan to a minimum speed when the pressure in said vapor line is equal to or greater than said predetermined threshold pressure.

5. An apparatus as set forth in claim 4 in which said fan speed control circuitry includes a motor that has an off state and one or more nominally fixed operating speeds, and in which said minimum speed corresponds to said off state.

6. An apparatus as set forth in claim 4 in which said fan speed control circuitry includes a motor that is adapted to operate at a variable speed that ranges from a speed approximately equal to zero to a predetermined maximum speed, and in which said minimum speed corresponds to said speed approximately equal to zero.

7. An apparatus as set forth in claim 1 in which the defrost condition detecting device comprises a temperature sensitive switch, and in which the defrost inhibiting device comprises a switch for interrupting the flow of current through said temperature sensitive switch when the pressure limiting circuitry is limiting the pressure in said vapor line.

8. An apparatus as set forth in claim 7 in which said pressure limiting circuitry includes a pressure sensitive switch, in which said temperature sensitive switch comprises the contacts of a defrost thermostat, and in which said current interrupting switch comprises the contacts of a relay having a coil connected to said pressure sensitive switch.

9. An apparatus as set forth in claim 8 in which said coil is connected in parallel with said pressure sensitive switch, and in which current through said coil flows through said outdoor fan.

10. A method for eliminating unnecessary defrost cycles in a heat pump system of the type including a compressor, an outdoor unit having an outdoor coil and an outdoor fan, an indoor unit having an indoor coil and an indoor fan, and a liquid line and a vapor line for connecting said indoor and outdoor coils and said compressor in a closed fluidic path, said heat pump system being adapted to operate in any of a cooling mode, a heating mode and a defrosting mode, said method comprising the steps of:
   (a) sensing one of the pressure and temperature of the refrigerant fluid in said vapor line to determine the pressure within said vapor line;
   (b) decreasing the speed of said outdoor fan as necessary to limit the pressure in said vapor line to a predetermined maximum pressure;
   (c) detecting the existence of a frost forming condition at the outdoor coil;
   (d) initiating a defrost cycle when said frost forming condition has existed at said outdoor coil for more than a predetermined delay time; and
   (e) restarting said predetermined delay time when said frost forming condition exists because of the performance of said speed decreasing step.

11. A method as set forth in claim 10 in which said sensing step comprises the step of determining when the pressure in the vapor line is equal to or greater than a predetermined threshold pressure, and in which said detecting step comprises the step of indicating when the temperature of said outdoor coil has fallen below a predetermined minimum temperature.

12. A method as set forth in claim 10 in which said detecting step is performed by means of a thermostatic switch, and in which said restarting step comprises the step of interrupting the flow of current through said thermostatic switch.

13. In an apparatus for use in a heat pump system of the type including a compressor, an outdoor unit having an outdoor coil and an outdoor fan, an indoor unit having an indoor coil and an indoor fan, and a liquid line and a vapor line for connecting the coils of said indoor and outdoor units and said compressor in a closed fluidic path, said heat pump system being adapted to operate in any of a cooling mode, a heating mode and a defrosting mode, in combination:
   (a.) pressure indicating means, responsive to one of the temperature and pressure of the refrigerant fluid in said vapor line, for indicating the pressure within said vapor line;
   (b.) temperature sensing means connected to the outdoor coil, said temperature sensing means having a first state indicative of the existence of a frost forming condition when the temperature of the outdoor coil falls below a first predetermined temperature and a second state indicative of the absence of a frost forming condition when the temperature of said coil rises above a second predetermined temperature;
   (c.) control means for controlling the operation of said outdoor unit, said control means including:
      (i) pressure limiting means, responsive to said pressure indicating means, for controllably varying the speed of the outdoor fan and thereby maintaining the pressure within said vapor line at a pressure less than a predetermined maximum pressure; and
      (ii) defrost control means, responsive to said temperature sensing means, for causing the heat pump system to initiate a defrost cycle when said temperature sensing means assumes and remains in said first state for a delay time equal to or greater than a predetermined delay time; and
   (d.) resetting means for resetting said delay time when said pressure limiting means causes said temperature sensing means to assume said first state, but prevents said temperature sensing means from assuming said second state.

14. An apparatus as set forth in claim 13 in which said pressure limiting means includes a motor connected to drive said outdoor fan, and speed control means for reducing the speed of said motor to a minimum speed when the pressure in said vapor line is equal to or greater than a predetermined threshold pressure.

15. An apparatus as set forth in claim 14 in which said motor has an off state and one or more nominally fixed operating speeds, and in which said minimum speed corresponds to the off state of said motor.

16. An apparatus as set forth in claim 14 in which said motor is adapted to operate at a variable speed that ranges from a speed approximately equal to zero to a predetermined maximum speed, and in which said minimum speed corresponds to said speed approximately equal to zero.

17. An apparatus as set forth in claim 13 in which said temperature sensing means comprises temperature sensitive switching means, and in which said resetting means includes interrupting means for interrupting the flow of current through said temperature sensitive switching means.

18. An apparatus as set forth in claim 17 in which said temperature sensitive switching means comprises the contacts of a defrost thermostat, and in which said interrupting means comprises a relay having contacts connected to said temperature sensitive switching means and a coil connected to said pressure indicating means.

19. An apparatus as set forth in claim 18 in which current through the coil of said interrupting means flows through said outdoor fan.

\* \* \* \* \*